United States Patent [19]

Watanabe et al.

[11] Patent Number: 4,876,729

[45] Date of Patent: Oct. 24, 1989

[54] METHOD OF IDENTIFYING OBJECTS

[75] Inventors: Yuji Watanabe, Hirakata; Masahiro Nakamura, Osaki, both of Japan

[73] Assignee: Kabushiki Kaisha Komatsu Seisakusho, Tokyo, Japan

[21] Appl. No.: 271,405

[22] Filed: Nov. 14, 1988

Related U.S. Application Data

[63] Continuation of Ser. No. 147,088, Jan. 2, 1988, abandoned, which is a continuation of Ser. No. 703,989, Feb. 21, 1985, abandoned.

[30] Foreign Application Priority Data

Feb. 21, 1984 [JP] Japan .................................. 59-31043
Apr. 20, 1984 [JP] Japan .................................. 59-80763

[51] Int. Cl.$^4$ ............................................. G06K 9/48
[52] U.S. Cl. ......................................... 382/22; 382/54
[58] Field of Search ................. 382/8, 22, 26, 54; 358/107, 166, 282, 284; 364/572, 574, 825

[56] References Cited

U.S. PATENT DOCUMENTS

| | | | |
|---|---|---|---|
| 3,973,239 | 8/1976 | Kakumoto | 382/54 |
| 4,097,158 | 6/1978 | Dehalt | 356/160 |
| 4,183,013 | 1/1980 | Agrawala et al. | 382/22 |
| 4,201,977 | 5/1980 | Shimizu | 382/54 |
| 4,238,780 | 12/1980 | Doemens | 382/8 |
| 4,446,484 | 5/1984 | Powell | 358/166 |
| 4,500,202 | 2/1985 | Smyth | 382/8 |

OTHER PUBLICATIONS

Smith et al., "A New Algorithm for Edge Detection", *Computer Graphics and Image Processing*, 1975, vol. 4, pp. 56-62.

*Primary Examiner*—Leo H. Boudreau
*Assistant Examiner*—Jose L. Couso
*Attorney, Agent, or Firm*—Diller, Ramik & Wight

[57] ABSTRACT

In a method of identifying an object of the type wherein the object is photographed by a television camera, and a portion of the contour line of the object is detected by a photographed picture image, the picture image is scanned by a filter for designating a first group of a predetermined number of continuous picture elements and a second group of a plurality of picture elements spaced from the first group by a distance corresponding to the contour line of the object. Then presence or absence of a contour candidate point at which the brightness changes rapidly in respective picture image groups is detected, and it is identified that the object presents when the contour candidate points are simultaneously detected in respective picture element groups.

5 Claims, 16 Drawing Sheets

FIG.1
(PRIOR ART)
(a)
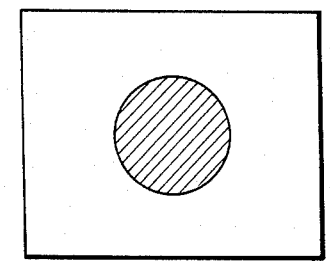
(b)
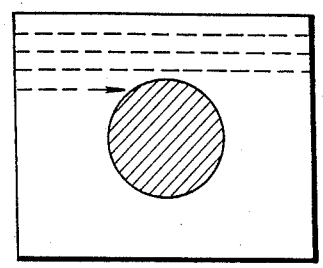
(c)
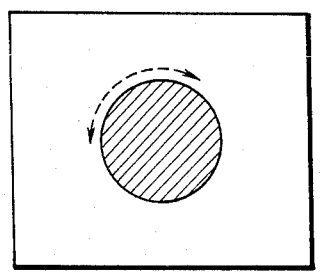
(d)
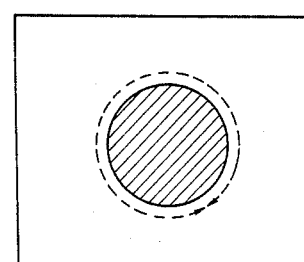
FIG.2
(PRIOR ART)
(a)
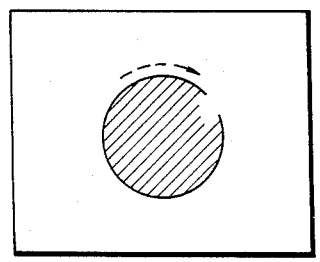
(b)
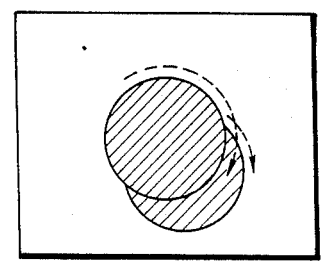

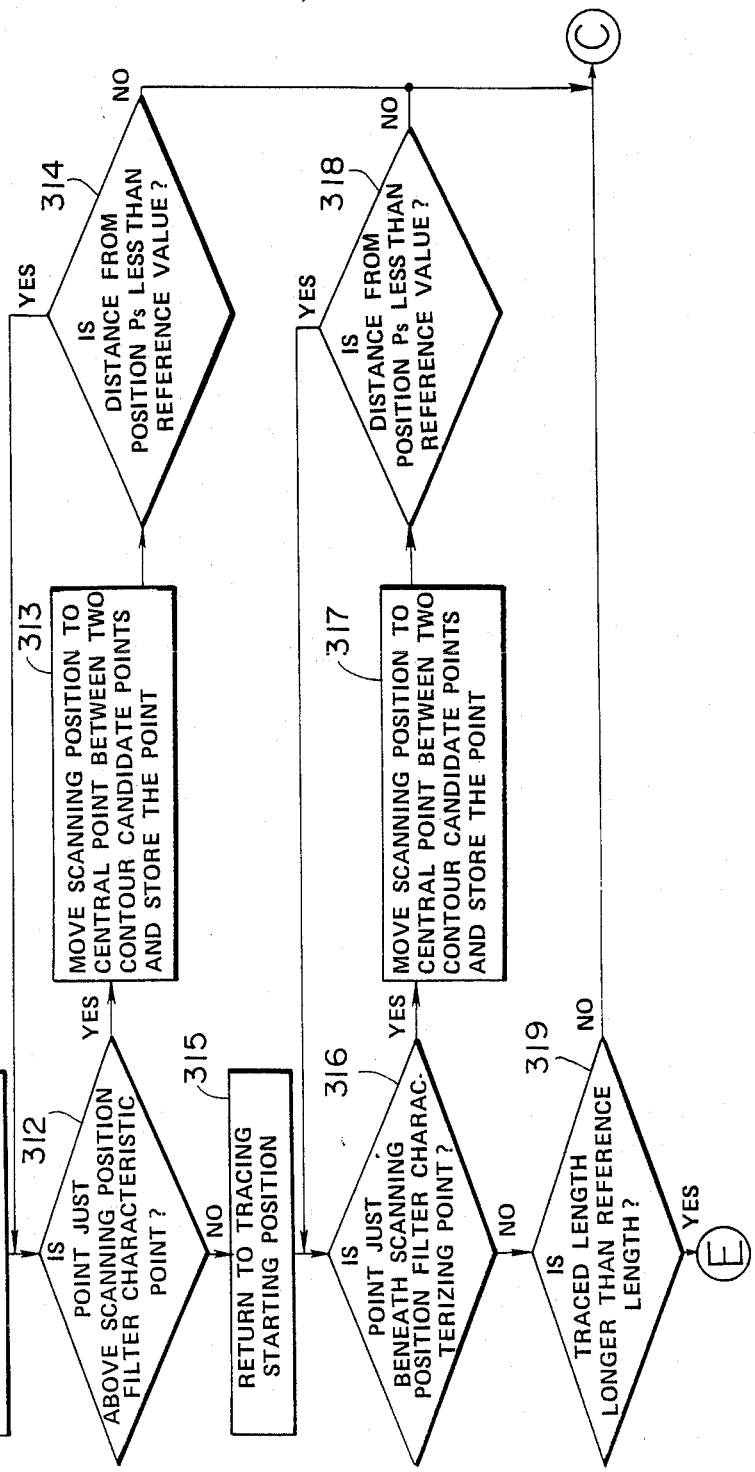

METHOD OF IDENTIFYING OBJECTS

This application is a continutation, of application Ser. No. 07/147,088 filed Jan. 20, 1988, now abandoned, which is a continuation of Ser. No. 06/703,989 of Feb. 21, 1985, now abandoned.

BACKGROUND OF THE INVENTION

1. Field of the Invention

This invention relates to a method of identifying an object by detecting a contour line of the object to be detected by using an image pick up apparatus, for example, a television camera or the like.

2. Description of the Prior Art

A convertional method of identifying an article or object to be identified utilizes the edges of respective surfaces of the objects, and according to this method, the point of the picture image at which the brightness changes abruptly are extracted as the edges, and the edges are connected together to convert them into a line picture.

The steps of identifying a circular body with the contour line extraction method will be described with reference to FIGS. 1a through 1d. At first, an original picture image (shown in FIG. 1a) photographed with a television camera is differentiated along respective scanning lines to extract a contour candidate point at which the brightness changes rapidly (see FIG. 1b). Then, respective picture elements near this point are differentiated. Among the differentiated values, a picture element having the maximum differentiated value is taken as a point continuous to the contour candidate point. This processing is repeated a certain number of times to obtain continuous contour points (contour line candidate point) (see FIG. 1c) and when these candidate points are closed (see FIG. 1d), they are deemed as an object.

According to this prior art contour extraction method, however, the tracing of the contour candidate points are rendered difficult by the following factors:

(1) blooming caused by metal luster (see FIG. 2a), (2) overlapping of objects (see FIG. 2b), (3) vague or not clear image caused by rust, spoil, etc. of the object surfaces, and (4) distortion of the picture image caused by electrical noise.

As a consequence, there is a defect that an actually presenting object would not be detected. Furthermore, identification algorithm for solving these problems becomes complicated so that real time processing is almost impossible.

SUMMARY OF THE INVENTION

It is an object of this invention to provide a novel method of identifying an object capable of simplifying the identification algorithm of an object to be detected, shortening the time of processing a picture image and increasing the percentage of correctly detecting the object.

According to this invention, there is provided a method of identifying an object of the type wherein an object to be detected is photographed, and the object is identified by detecting a portion of a contour line of a photographed picture image, characterized in that the method comprises the steps of: preparing filter means; scanning the picture image with the filter means for designating a first group of a predetermined number of continuous picture elements and a second group of a plurality of picture elements spaced from the first group by a distance corresponding to a contour line of the object; detecting presence or absence of a contour candidate point at which brightness changes rapidly in respective picture element groups; and identifying that the object presents when the contour candidate points are simultaneously detected in respective picture element groups.

According to a modification of this invention, there is provided a method of identifying an object wherein a portion of a contour line of the object to be detected comprises parallel lines, characterized in that the method comprises the steps of: preparing filter means; designating with the filter means a pair of picture element groups such that the center-to-center distance thereof will correspond to a spacing between the parallel lines; recognizing a scanning position at which contour candidate points are simultaneously detected in the picture element groups as a filter characteristic point; after detecting the filter characteristic point, trace scanning in an auxiliary scanning direction from the scanning position for detecting presence or absence of the filter characteristic point; and identifying presence of the object to be detected when a traced length becomes larger than a preset length.

According to still another embodiment of this invention, there is provided a method of identifying an object having substantially circular contour line, characterized by the steps of preparing filter means; designating with the filter means a pair of picture element groups having a center-to-center distance corresponding to the diameter of the substantially circular contour line; denoting a scanning position at which contour candidate points are simultaneously detected in the picture element groups as a filter characteristic point; after detecting the filter characteristic point, trace scanning in an auxiliary scanning direction from the scanning position for detecting presence or absence of the filter characteristic point; determining a center position candidate point of the substantially circular contour line from the central position between picture element groups by the filter means and a center position of the traced length when the traced length exceeds a preset length; detecting presence or absence of the filter characteristic point or a contour candidate point by sequentially rotating the filter means about the candidate point of the center position, and then identifying presence or absence of the object when percentage of a presence of the filter characteristic point or the contour candidate point exceeds a preset value.

BRIEF DESCRIPTION OF THE DRAWINGS

In the accompanying drawings:

FIGS. 1a through 1d are schematic representations showing the steps of identifying an object according to a prior art contour line extraction method;

FIGS. 2a and 2b show examples of the factors that render difficult to trace a contour line according to a prior art method;

DESCRIPTION OF THE PREFERRED EMBODIMENTS

The invention will be described hereunder with reference to the preferred embodiments.

The principle of the method of this invention will firstly be described with reference to FIGS. 3a and 3b. Suppose now that a dark object 1 to be detected presents in a bright background. The brightness (black and white) of the object 1 along a sectional line a is shown by a graph shown in FIG. 3b. Points A and B shown in FIG. 3b at which the brightness changes rapidly are characteristic points of the object. At point A the brightness decreases or builds down, whereas at point B the brightness increases or builds up.

According to the method of this invention, the object is identified by checking as to whether there are contour candidate points at which the brightness changes rapidly at the same time in a plurality of ranges set in connection with the contour line of the object to be detected. Furthermore, the identification of the object is made to be more accurate by checking whether the direction of variation in the brightness at each candidate point coincides with a direction determined by the background and the brightness thereof.

A filter used for identifying an object according to the present invention will be described hereunder.

According to this invention, a filter is defined as a means for designating the picture data having a specific locational relation among picture data in one filed of a television camera. In other words, the term filter does not mean optical or physical filter but is derived from its function.

Figure 4:
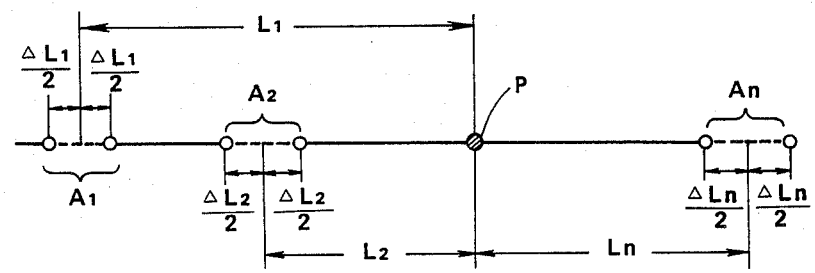
FIGS. 4 and 5 show filters utilized in this invention.

More particularly, as shown in FIG. 4, the filter in this invention designates several specific ranges $A_1$, $A_2$,—$A_n$ each having specific length among picture data in one field. Each range $A_1$, $A_2$,—$A_n$ consists of a group of aligned picture elements arranged in one line having the length of $\Delta L_1, \Delta L_2$—, $\Delta L_n$, respectively, and is spaced from the reference position P by a distance of $L_1, L_2,$—$L_n$, respectively.

Assuming that N represents a maximum number of contour points of an object encountered when the object is cut transversely, the number n is chosen from two to N ($2 \leq n \leq N$). Since large n results in long picture image processing time and small n results in high probability of erroneous recognition, suitable value has to be chosen within the above-mentioned scope ($2 \leq n \leq N$). Spacings $L_1, L_2,$—, $L_n$ are determined principally by the geometrical configuration of the object to be detected and the magnifying power of the television camera, Furthermore, the lengths of ranges $\Delta L_1, \Delta L_2,$—$L_n$ are determined considering types of the contour of the object corresponding to each range (3-dimensional shape), noise, blooming, distortion of the optical system, etc.

Filters thus defined are set in advance corresponding to the contour line of the object to be detected, an input picture is scanned by using the filters and a check is made as to whether, there are contour candidate points in every ranges $A_1, A_2$—, $A_n$. (the reference position P when there are contour candidate points in every ranges is referred to as a filter characteristic point.)

Figure 3:
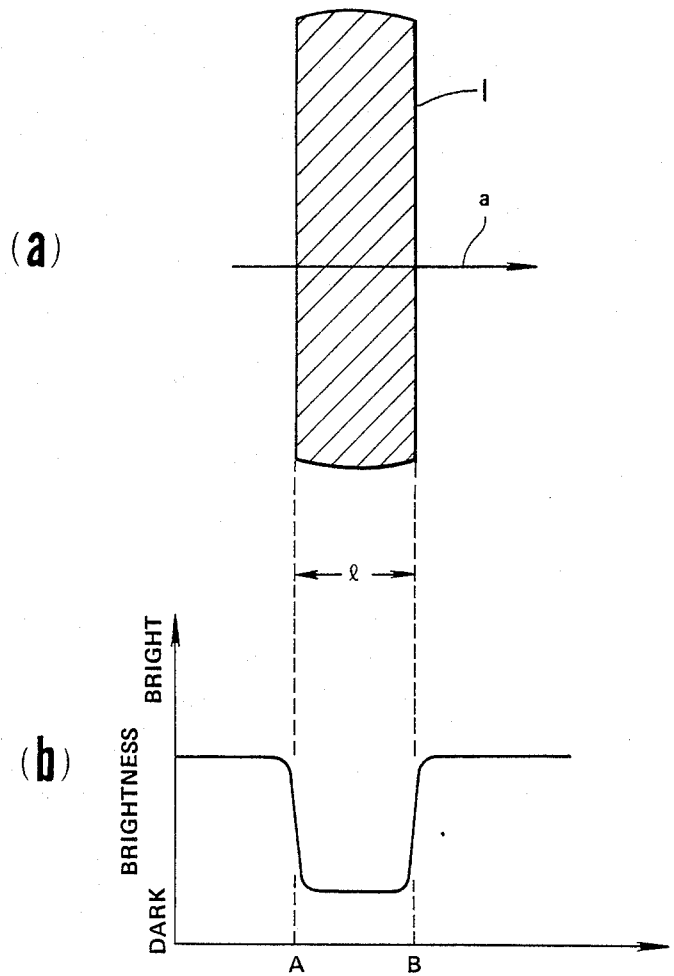
FIGS. 3a and 3b are schematic representations for explaining the principle of this invention.
Figure 5:
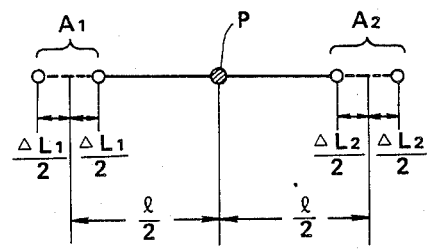

For example, as shown in FIG. 5, a filter comprising two ranges $A_1$ and $A_2$ (the spacing between the centers of these two ranges is l) is set for an object 1 shown in FIG. 3. Then, while moving the filter position (represented by the reference position P shown by a hatched circle), a check is made as to whether contour candidate points concurrently present in the ranges $A_1$ and $A_2$.

To illustrate in a more concrete manner, assuming that one field consists of n x m picture elements, the distance between the contour lines of the object 1 corresponds to eleven picture elements Assuming that the lengths $\Delta L_1$ and $\Delta L_2$ consists of three picture elements respsectively and the reference position is located at a picture element e (i, j), this filter designates six picture elements of [$A_1$|e(i−6, j), e(i−5, j), e(i−4, j)] and [$A_2$|e(i+4, j), e(i+5, j), e(i+6, j)]. It is obvious that designated picture elements move as the filter position moves. Then a check is made as to whether there is a filter characteristic point at which contour candidate points exist concurrently in the range [$A_1$|e(i−6, j), e(i−5, j), e(i−4,j)] and the range [$A_2$|e(i+4, j), e(j+5, j), e(i+6, j)]. This check can be made by monitoring brightness difference corresponding to each end of the ranges $A_1$ and $A_2$. Alternately, whether the directions of brightness variation in respective ranges $A_1$, $A_2$, —, $A_n$ coincide with those determined by the object and its background amy be adopted as a criterion for checking the presence of a characteristic point. In other words, as shown in FIG. 5, when there concurrently exist contour candidate points whose brightness varies from light to dark in the range $A_1$ and from dark to light in the range $A_2$, a filter characteristic point is judge to exist.

Figure 6:
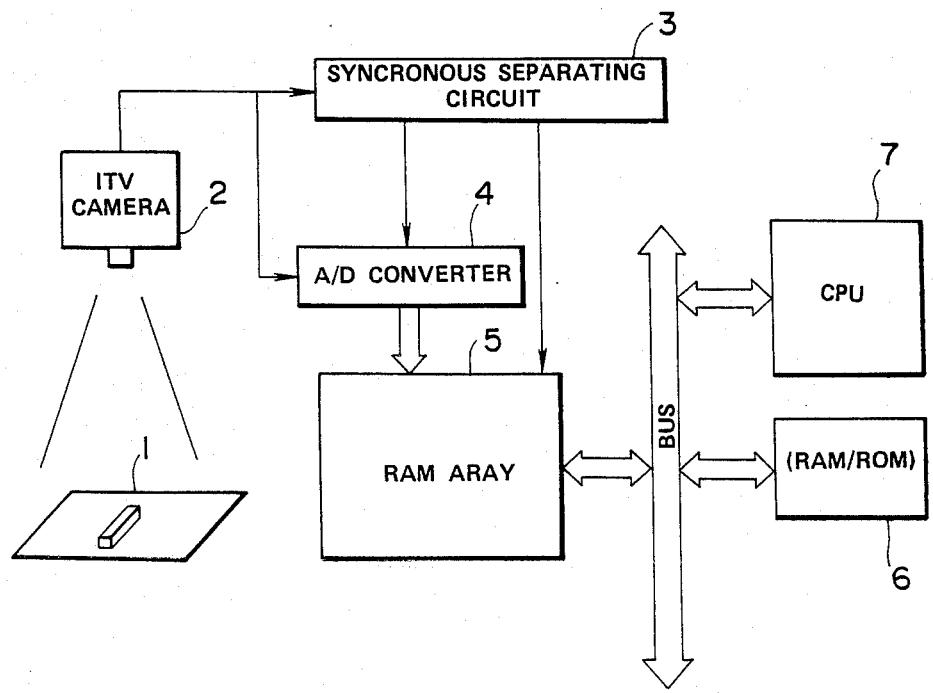
FIG. 6 is a block diagram showing one example of a logic circuit utilized to carry out the method of this invention.
Figure 7:
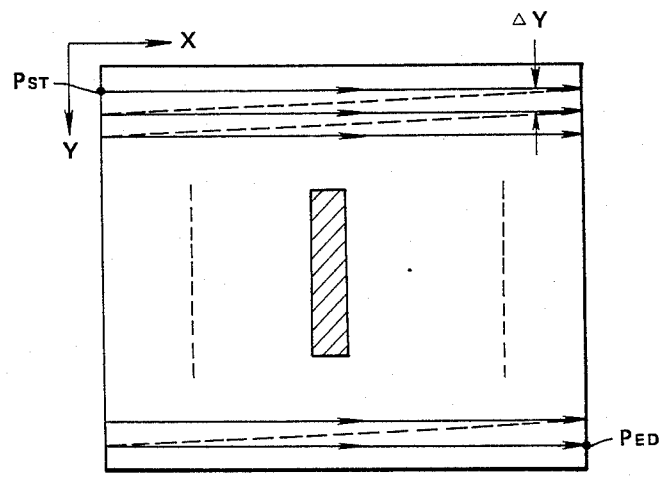
FIGS. 7, 19 and 25 show the brightness of the picture image data stored in the RAM array shown in FIG. 6.

An industrial television (ITV) camera 2 shown in FIG. 6 photographs the object 1 to be detected in a predetermined field of view to send a video composite signal containing the brightness signal of the input picture image to a synchronous isolating circuit 3 and an A/D converter 4. The synchronous isolating circuit 3 operates to separate a synchronizing signal from the video composite signal. The synchronizing signal thus separated is used to designate an address of a random access memory array (RAM array) 5, while the A/D converter 4 converts the inputted video composite signal into a picture imag data having 16 tones of brightness for writing the picture image data in the designated address. In this manner, picture image data of one picture representing the brightness of the original picture image shown in FIG. 7 are stored in the RAM array 5. Any picture image data can be read out by designating X and Y addresses of the RAM array 5.

A memory circuit 6 stores parameters constituting the filter as well as the main program, (ROM) for carrying out the method of this invention, and a central processing unit (CPU)7 executes the processings of the picture image data stored in the RAM array 5 in accordance with the content of the filter and the content of the main program.

Now explanation will be made as to filter parameters to be registered in the memory 6 and its storage manner.

Various types of data sets having respective ranges and designating the aforementioned filter (which data sets will be defined as the filter element data sets), as will be clear from the foregoing explanation, indicate ranges having specific intervals respectively. That is, each of the data sets indicative of the respective ranges comprises data (first data) indicative of the respective amounts of offset in two points corresponding to both ends of the range from said reference position P, a data (a second data) indicative of a threshold value as to a brightness difference between picture elements (picture image data) corresponding to these two points, and a data (a third data) indicative of a condition as to a brightness gradient between the picture elements (picture image data) corresponding to the two points.

In the case of the filter shown in FIG. 4, for example, the filter element data set corresponding to the range $A_1$ comprises an offset amount data $(X_1, Y_1)$ of a left end point of the range $A_1$ from the reference position P, an offset amount data $(X'_1, Y'_1)$ of a right end point of the range $A_1$ from the reference point P, a threshold value data $T_1$ on a brightness difference between these left and right end points, and a condition data $g_1$ on a brightness gradient between the left and right end points; the filter element data set corresponding to the range $A_2$ comprises an offset amount data $(X_2, Y_2)$ of a left end point of the range $A_2$ from the reference position P, an offset amount data $(X'_2, Y'_2)$ of a right end point of the range $A_2$ from the reference point P, a threshold value data $T_2$ on a brightness difference between these left and right end points, and a condition data $g_2$ on a brightness gradient between the left and right end points; and the filter element data set corresponding to the range $A_n$ comprises an offset amount data $(X_n, Y_n)$ of a left end point of the range $A_n$ from the reference position P, an offset data $(X'_n, Y'_n)$ of right end point of the range $A_n$ from the reference point P, a threshold value data $T_n$ on a brightness difference between these left and right end points, and a condition data $g_n$ on a brightness gradient between the left and right end points. And these filter element data sets are colectively registered in the aforementioned memory 6 as filter data in such a manner as to be given in Table 1 below.

TABLE 1

| Contents | First Data | | Second Data (Brightness difference threshold value) | Third Data (Brightness gradient) |
|---|---|---|---|---|
| | Offset amount of left end point from P | Offset amount of right end point from P | | |
| Range | | | | |
| $A_1$ | $X_1, Y_1$ | $X'_1, Y'_1$ | $T_1$ | $g_1$ |
| $A_2$ | $X_2, Y_2$ | $X'_2, Y'_2$ | $T_2$ | $g_2$ |
| $A_n$ | $X_n, Y_n$ | $X'_n, Y'_n$ | $T_n$ | $g_n$ |

In the case of the filter shown in FIG. 4, since the ranges $A_1$, $A_2$, and $A_n$ are all set one-dimensionally in the x-axis direction with respect to the reference position P, the offset amounts $Y_1$, $Y'_1$, $Y_2$, $Y'_2$, $Y_n$ and $Y'n$ given in Table 1 above become all "0".

In the above table, the brightness difference threshold value T as the second data is determined as a limit value of a brightness difference between picture elements (picture image data) corresponding to the left and right end points so that the contour part of the corresponding detection object can be correctly identified as a contour part on the basis of the type (three-dimensional configuration) of the object in connection with the width (a distance between the left and right end points) of the corresponding range.

In the above table, further, the brightness gradient g as the third data is set, for example, to be "+1" under a condition that the brightness of one of the picture elements (picture image data) corresponding to right one of the above two points (left and right end points) is higher than that of the other picture element corresponding to the left end point, and set conversely to be "−1" under a condition that the brightness of the picture image data corresponding to the right end point is lower than that of the picture image data corresponding to the left end point.

With such a filter as shown in FIG. 4, the values given in the drawing such as $L_1$, $\Delta L_1$, have relationships with the above filter data, which are collectively listed below.

$X_1 = -L_1 \Delta L_1/2, X'_1 = -L_1 + \Delta L_1/2$ $X_2 = -L_2 - \Delta L_2/2, X'_2 = -L_2 + \Delta L_2/2$ $X_n = L_n - \Delta L_n/2, X'_n = L_n + \Delta L_n/2$ $Y = Y'_1 = Y_2 = Y'_2 = Y_n = Y'_n = 0$ $T_1$, $T_2$ and $T_n$ are arbitrarily set according to the type (three dimensional configuration) of the corresponding contour part in connection with $\}(X_1, O), (X'_1, O)\}$, $\{(X_2, O), (X'_2, O)\}$ and $\{(X_n, O), (X'_n, O)\}$.

$g_1 = +1, g_2 = -1,$ and $g_n = -1.$

Figure 8:
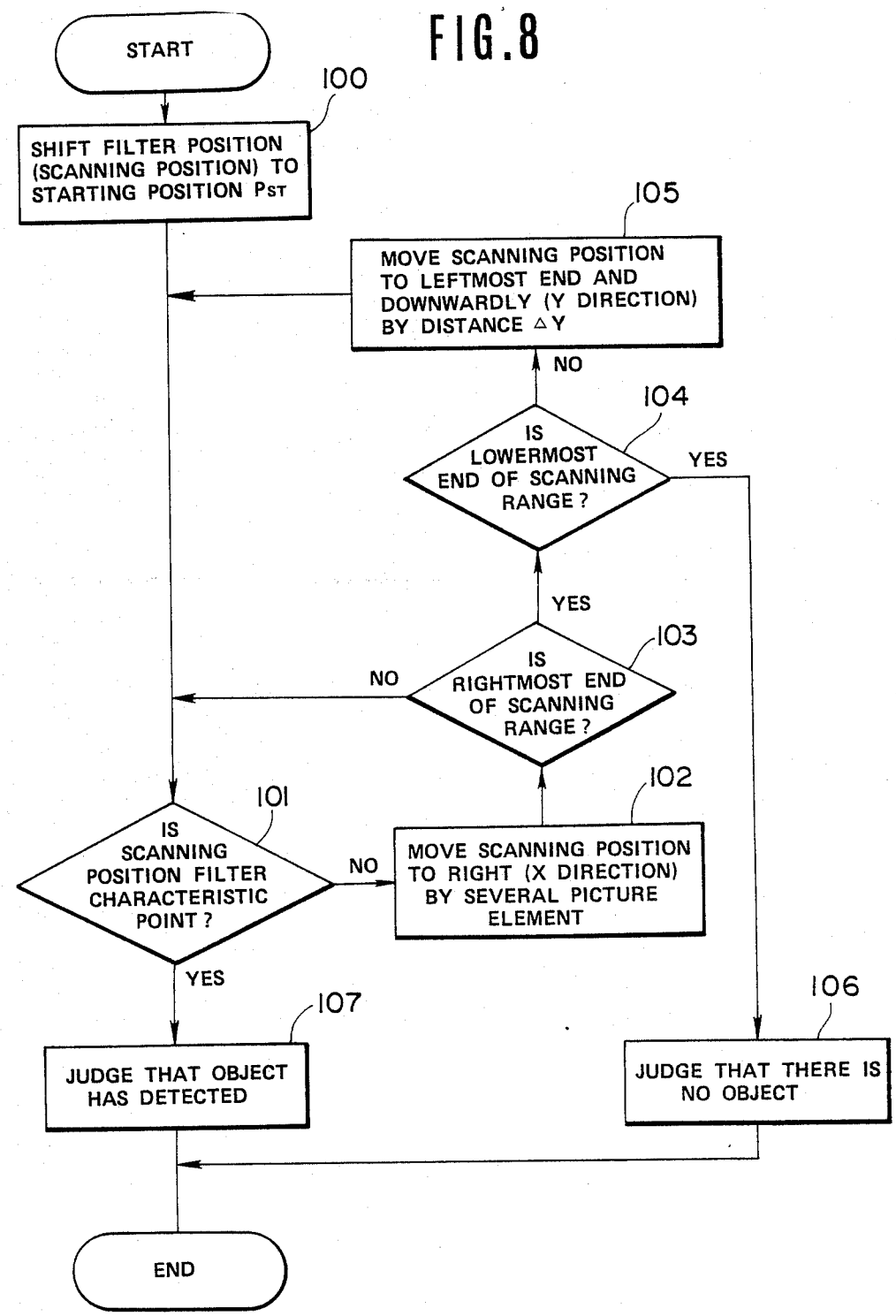
FIGS. 8, 16, 17, 18, 23 and 24 are flow charts showing the steps of processings with a central processing unit (CPU) shown in FIG. 6.

The steps of processings executed by CPU 7 will be described with reference to the flow chart shown in FIG. 8.

The CPU 7 basically functions to scan input picture image data (data stored in the RAM array 5) on the basis of comparison with aformentioned filter data, to detect whether or not two conditions are simultaneously satisfied, that is, one condition that the brightness difference between the picture image data corresponding to two points and represented by the first data simultaneously exceeds the corresponding threshold value represented by the second data with respect to all the filter element data sets, and the other condition that the brightness gradient between the picture image data corresponding to the two points satisfies the corresponding condition given by the third data with respect to all the filter element data sets. And when these conditions are met, the CPU 7 that the aforementioned filter characteristic point is present. More specifically, at step 100, the filter position i.e., a reference position P (which will be a filter supporting point for scanning) of the filter shown in FIG. 5 is moved to the starting position $P_{ST}$ shown in FIG. 7, and at step 101, a check is made as to whether the scanning position is the filter characteristic point or not.

The judgment as to whether the scanning position is the characteristic point of the filter or not is effected by differentiating the picture image data of two picture element groups designated by the filter.

To differentiate the picture image data after the D/A conversion, a difference computation is effected. The following equations are generally used for the difference computation.

Primary difference: $\Delta f(i) = f(i) - f(i-1)$    (1)

Secondary difference: $\Delta^2 f(i-1) = f(i) + f(i-2) - 2f(i-1)$
   10 (2)

Figure 9:
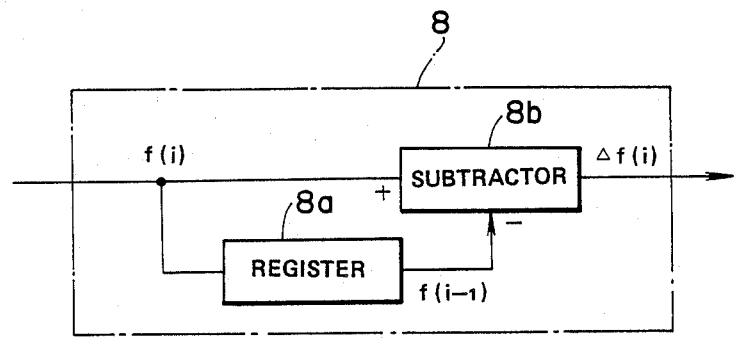
FIGS. 9 and 10 are block diagrams showing different examples of the differentiating circuit.

A differentiating circuit 8 shown in FIG. 9 is given an example of a circuit for performing the difference computation represented by equation (1) actually executed by the CPU 7. In the difference computation, picture image data f(i) sequentially derived out from continuous picture element groups designated by the filter are applied to a register 8a and a subtractor 8b. The register 8a is used to delay the picture image data by one picture element and to supply to the subtractor 8b picture image data f(i−1) one picture element before. The subtractor 8b performs the subtraction operation shown in equation (1) in accordance with the two inputs for outputting picture image data representing the primary difference $\Delta f(i)$.

Figure 10:
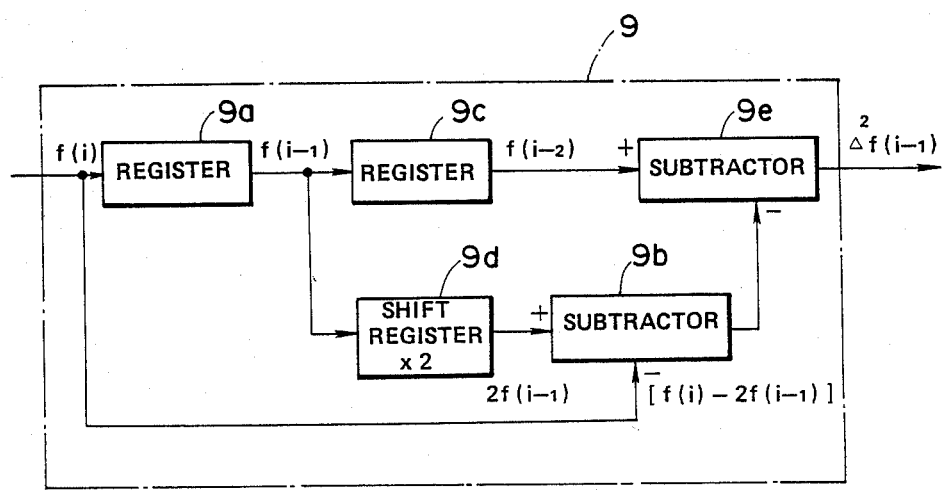

FIG. 10 shows another example of the differentiating circuit 9 performing the difference computation of the secondary difference shown in equation (2) in which the picture image data f(i) sequentially derived out from continuous picture element groups designated by the filter are applied to a register 9a and a subtractor 9b. The purpose of the register 9a is to delay the picture image data by one picture element and to supply the picture image data f(i−1) one picture element before to a register 9c and a shift register 9d. In the same manner as the register 9a, the register 9c delays the picture image data by one picture element for supplying to the subtractor 9c picture image data f(i−2) two picture elements before.

The shift register 9d doubles the input picture image data f(i−1) by shifting the same by one bit and supplies the doubled picture image data to the subtractor 9b which subtracts picture image data f(i) from picture image data 2f(i−1) for supplying the difference to a subtractor 9e. The subtractor 9e subtracts the difference value from the subtractor 9e from the picture image data outputted from register 9c for producing picture image data representing the secondary difference $\Delta^2 f(i-1)$.

When the absolute values of the differentiated outputs of the differentiating circuits 8 and 9 exceed a given threshold value (i.e. threshold value of brightness difference T; second data); it is judged that a contour candidate point at which the brightness changes rapidly exists, and at step 101, the direction of the variation of the brightness (brightnss gradients; third date) is judged in accordance with the positive or negative sign of the differentiated output.

If the scanning position thus checked is not the characteristic point of the filter, the scanning position is moved to the right (X direction) by several picture elements at step 102. The amount of this shift is determined by the check ranges $\Delta L_1$ and $\Delta L_2$ of the filter.

At step 103, a judgment is made as to whether the scanning position is at the rightmost end of the scanning range or not. If the result of judgment is NO, then at step 101, a judgment is made as to whether the present position is the characteristic point of the filter or not. When the result of judgment is NO, the processing described above is repeated.

In this manner, when the scanning position reaches the rightmost end of the scanning range without finding the characteristic point of the filter, at step 104, a judgment is made as to whether the scanning position is the lowermost end or not.

When the scanning position is at the lowermost end, i.e., the position $P_{ED}$ shown in FIG. 6, at step 105, it is judged that there is no object to be detected in the picture and the processing of the picture image is terminated. On the other hand, where the scanning position is not at the lowermost end of the scanning range, the scanning position is returned to the leftmost position, at step 106, the scanning position is moved toward lower (Y)direction by a distance $\Delta Y$, as shown in FIG. 7. After that, the scanning is started again from that position to check whether there is a characteristic point or not.

As the characteristic point of the filter is detected by scanning the picture with the filter, at step 107, it is judged that an object was detected at that scanning position.

It should be understood that the filter is not limited to that shown in the above-mentioned embodiment in which ranges $A_1, A_2,---, A_n$ arrayed along a single scanning line. As shown in FIGS. 11-14, ranges (shown by circles) may be arranged radially around the reference position (shown by a hatched circle). In this case, it would be desirable that each range is arranged such that it crosses the contour line of the object to be detected perpendicularly.

Figure 11:
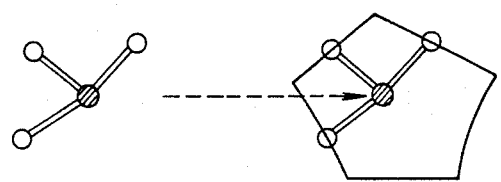
FIGS. 11 through 15 show other examples of the filter.
Figure 12:
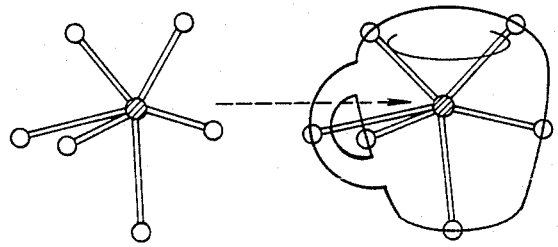
Figure 13:
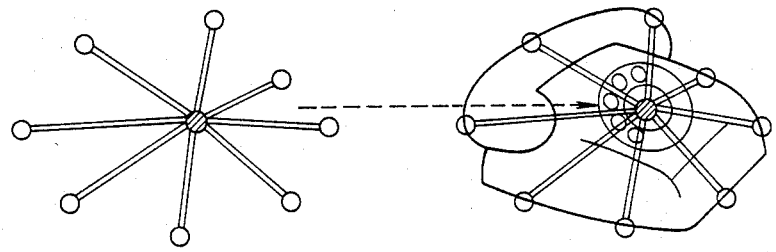
Figure 14:
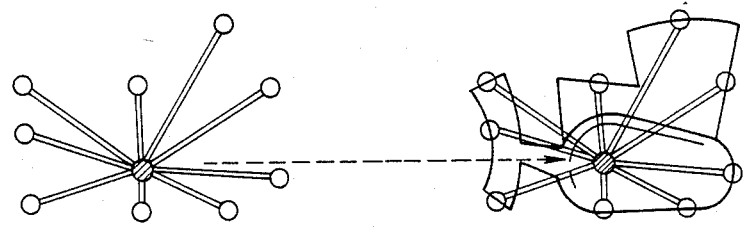

With the filter shown in FIG. 11, for example, filter parameters registered in the memory 6 are as given in Table 2 below.

TABLE 2

| | First Data | | Second Data (Brightness difference threshold value) | Third Data (Brightness gradient) |
| --- | --- | --- | --- | --- |
| Contents | Offset amount of one end point from reference position (P) | Offset amount of the other end point from reference position (P) | | |
| Range | | | | |
| $A_1$ (Lower left) | $X_1, Y_1$ | $X'_1, Y'_1$ | $T_1$ | $g_1$ |
| $A_2$ (Upper left) | $X_2, Y_2$ | $X'_2, Y'_2$ | $T_2$ | $g_2$ |
| $A_n$ (Right) | $X_n, Y_n$ | $X'_n, Y'_n$ | $T_n$ | $g_n$ |

Figure 15:
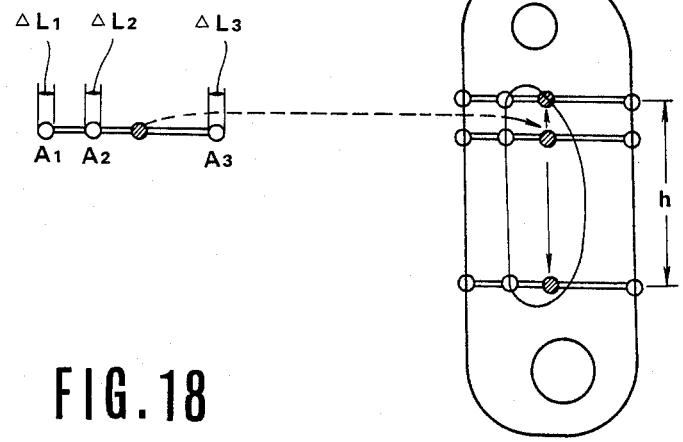

In the table, when the end points of each of the respective ranges are selected to satisfy $X_n/X'_n = Y_n/Y'_n$, a line connecting the end points in each range becomes perpendicular to the contour line of the object.

Where an object to be detected 10 is identified by a filter that specifies ranges $A_1, A_2$ and $A_3$ shown in FIG. 15, since the characteristic point of the filter appears when the filter passes a substantially central portion of the object, it would be impossible to specify the correct position of the object. In such a case, the filter is moved in the vertical direction (an auxiliary scanning direction) for investigating a region containing the characteristic point of the filter so as to specify the accurate position of the object. When an additional judgment is made in which only when the traced length of the characteristic point of the filter in the auxiliary scanning direction exceeds a reference length, it is judged that the object 10 presents, so that the object can be identified at a higher accuracy.

A method of identifying an object, a portion of its contour line being parallel lines will now be described with reference to flow charts shown in FIGS. 16, 17 and 18.

Figure 19:
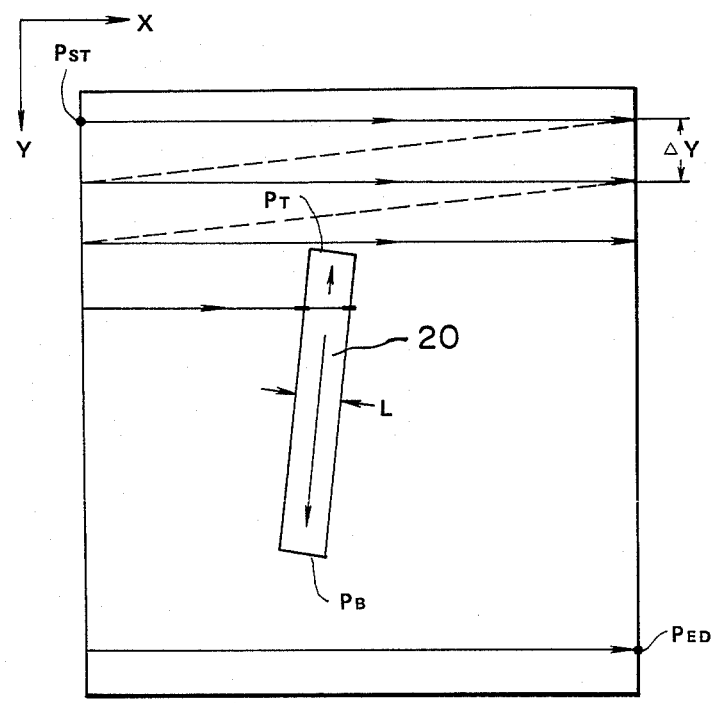

It is assumed that the object to be detected is a round rod 20 shown in FIG. 19. In this case, a filter similar to that shown in FIG. 5 is used wherein the center-to-center distance of the specific ranges $A_1$ and $A_2$ corresponds to the diameter L of the round rod 20.

Figure 16:
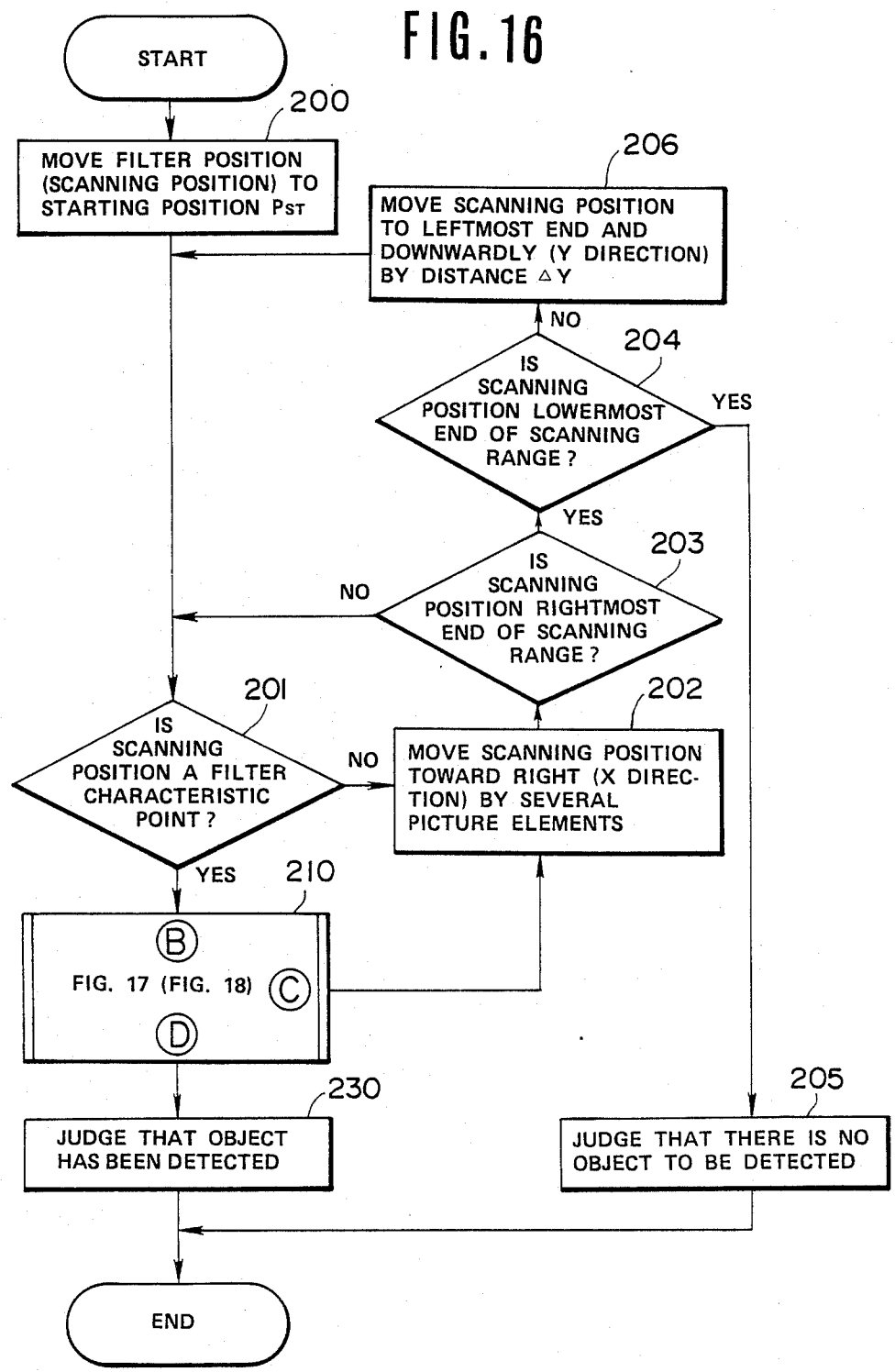

In the flow chart shown in FIG. 16, at steps 200–206, the cross-section of the round rod 20 is searched. The processings executed at these steps are identical to those executed at steps 100–106 shown in FIG. 8, so that the description thereof will not be made.

A case wherein the cross section of the round rod 20, that is the characteristic point of the filter, has been detected will be described.

Figure 17:
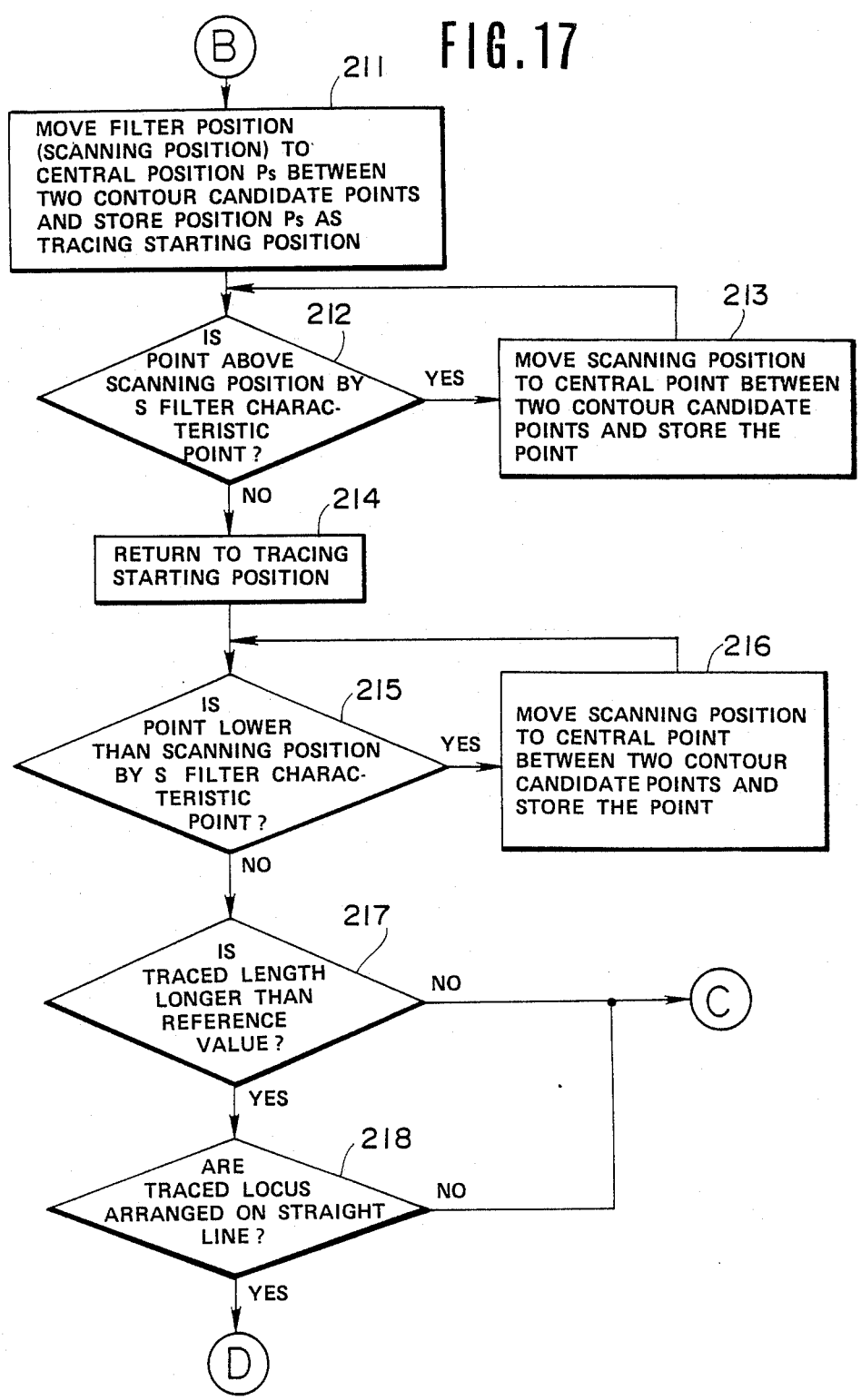
Figure 20:
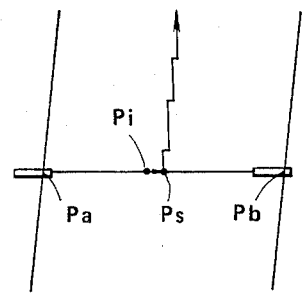
FIG. 20 is an enlarged view of a portion of FIG. 19.

In this case, the program is advanced to the flow chart shown in FIG. 17. At first, as shown in FIG. 20, the filter position (scanning position) Pi at which the filter characteristic point has been found is moved to a center position Ps between two contour candidate points Pa and Pb, and at step 211, this point Ps is stored as the tracing starting position Ps in the auxiliary scanning direction. More particularly, when the filter characteristic point thus detected is caused by desired parallel contour lines, it may be considered that the filter characteristic points present continuously in the vertical direction. For the purpose of checking such continuity, the tracing starting position Ps is stored at first.

Then, the scanning position is moved upwardly by a distance S from the starting position Ps, and at step 212, a check is made as to whether this point is the filter characteristic point or not. Where the scanning position is the filter characteristic point, that scanning position is moved to the center position between two profile candidate points and the scanning position is stored at step 213. Then, a check is made again as to whether a point just above and spaced by a distance S from the cente point is the filter characteristic point or not. In this manner, the tracing of the filter characteristic point is continued until no more filter characteristic point presents (see FIG. 20).

On the other hand, when a point just above and spaced from the scanning position by a distance S is not the filter characteristic point, in other words, the upward tracing of the filter characteristic point completes, at step 214, the scanning position is returned to the tracing starting position Ps. After that, at steps 215 and 216, the tracing of the filter characteristic point is effected downwardly in the same manner as above described until no more filter characteristic point presents.

As above described, when the tracing in the vertical direction of the filter characteristic point starting from the tracing starting position completes, the length of the tracing (the length of the parallel lines) is determined from the uppermost point PV and the lowermost point PB (FIG. 19) among a number of scanning positions sequentially stored during the tracing. Then at step 217, a judgment is made as to whether the traced length is longer than a reference length or not. When the traced length is shorter than the reference length, it is judged that the parallel lines are not the desired ones. Then, the scanning for searching the filter characteristic point is executed again according to the flow chart shown in FIG. 16. When the traced length is longer than the reference length, at step 218, a judgment is made whether the traced locus are arranged on a substantially straight line or not.

Figure 21:
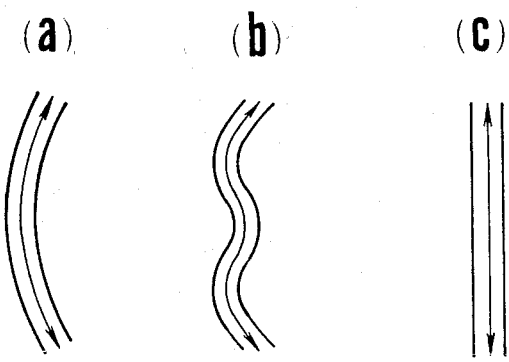
FIGS. 21a, 21b and 21c and FIGS. 22a and 22b are diagrams useful to explain how to identify parallel lines of different type.

As the method of judgment may be considered a linear approximation method and a geometrical acceleration method. According to the former method, an approximate straight line is obtained from all scanning positions stored during the tracing and then a judgment is made as to whether substantially all points are within a predetermined distance from the approximate straight line. According to the latter method, twice differential operations are sequentially made in the vertical direction with respect to all scanning positions, and a judgment is made as to whether the twice differentiated values are substantially zero or not. As a result of this judgment, it becomes to identify two lines shown in FIGS. 21a and 21b and the parallel lines shown in FIG. 21c. For the sake of description, two lines shown in FIGS. 21a and 21b are herein called parallel lines.

When it is judged that the traced locus are not arranged in a straight line, it is judged that they are not the desired parallel lines and the scanning for searching the filter characteristic point is executed according to the flow chart shown in FIG. 16. When it is judged that the traced locus are on a substantially straight line, at step 230 shown in FIG. 16, it is judged that the object has detected thereby ending the processing of the picture image.

Figure 22:
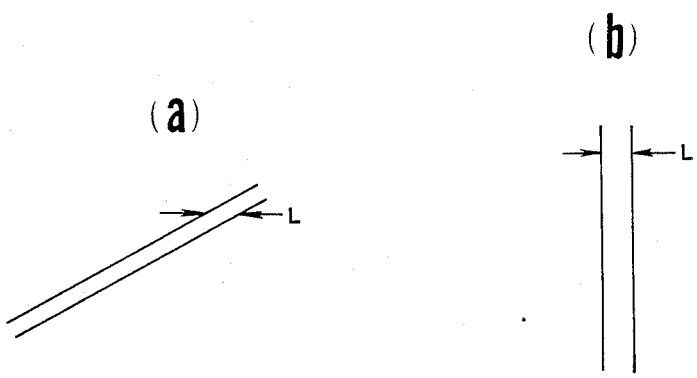

It is also possible to determine the inclination of the approximate straight line. When the inclination is larger than a predetermined reference value, the lines are judged that they are not parallel. With this measure, it becomes possible to identify two types of parallel lines shown in FIGS. 22a and 22b.

Figure 18:
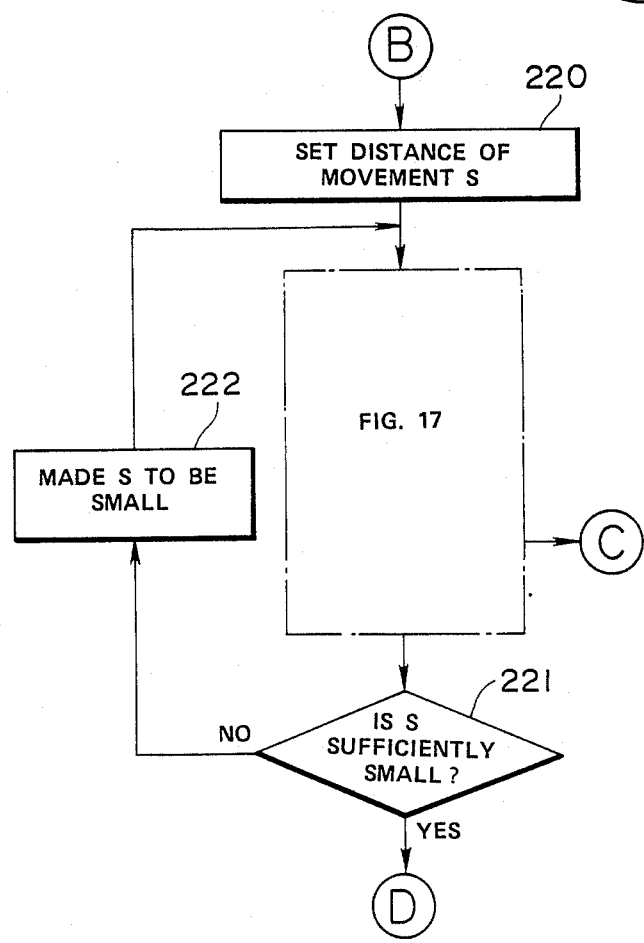

Instead of the tracing processing shown in FIG. 17, the tracing porcessing according to the flow chart shown in FIG. 18 may be executed. Like the flow chart shown in FIG. 7, the flow chart shown in FIG. 18 contains processings of setting and changing the distance of movement S at the time of tracing the filter position in the vertical direction. More particularly, at step 220, the distance S of movement is set followed by the tracing processings similar to those shown in FIG. 17. After judging that the traced locus are arranged on a substantially straight line, at step 221 shown in FIG. 18, a judgment is made as to whether the distance S is sufficiently small or not. When the distance is sufficiently small, at step 230 shown in FIG. 16, it is judged that the object has been detected, thus ending the picture image processing. On the other hand, when the distance S is not sufficiently small, at step 222, the distance S is reduced and the filter characteristic point is again checked by using the reduced distance S. The distance S set, the reference for judging whether the distance S is sufficiently small, and the ratio of reduction the distance S are determined by the fineness of the checking and the fineness is determined by the fact that the picture image contains how many characteristics that can be considered as parallel lines.

Although in the foregoing embodiment, the object to be detected was a round rod, any other objects containing parallel line portions sufficient to specify the objects can be used.

Figure 23:
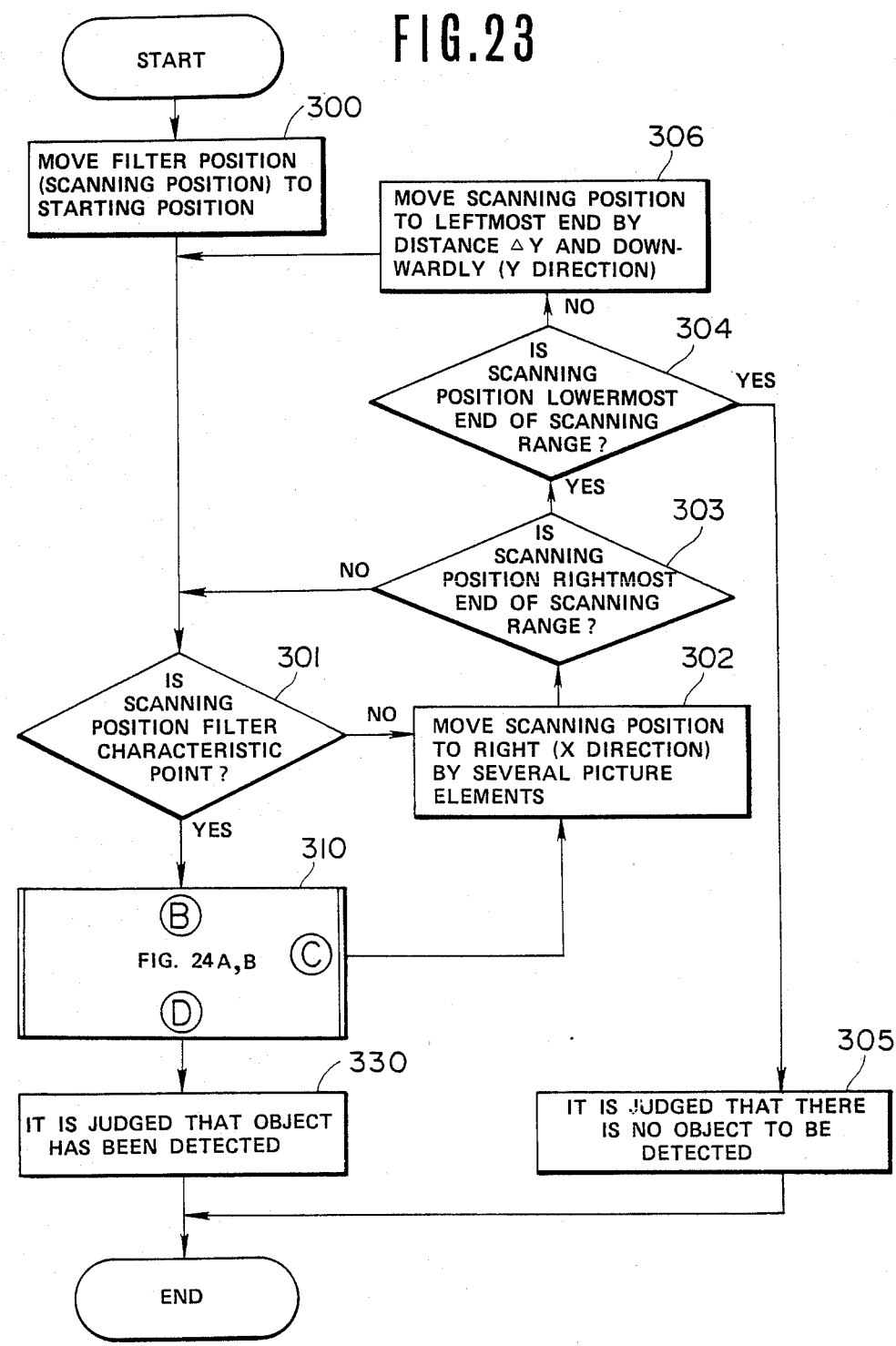
Figure 24B:
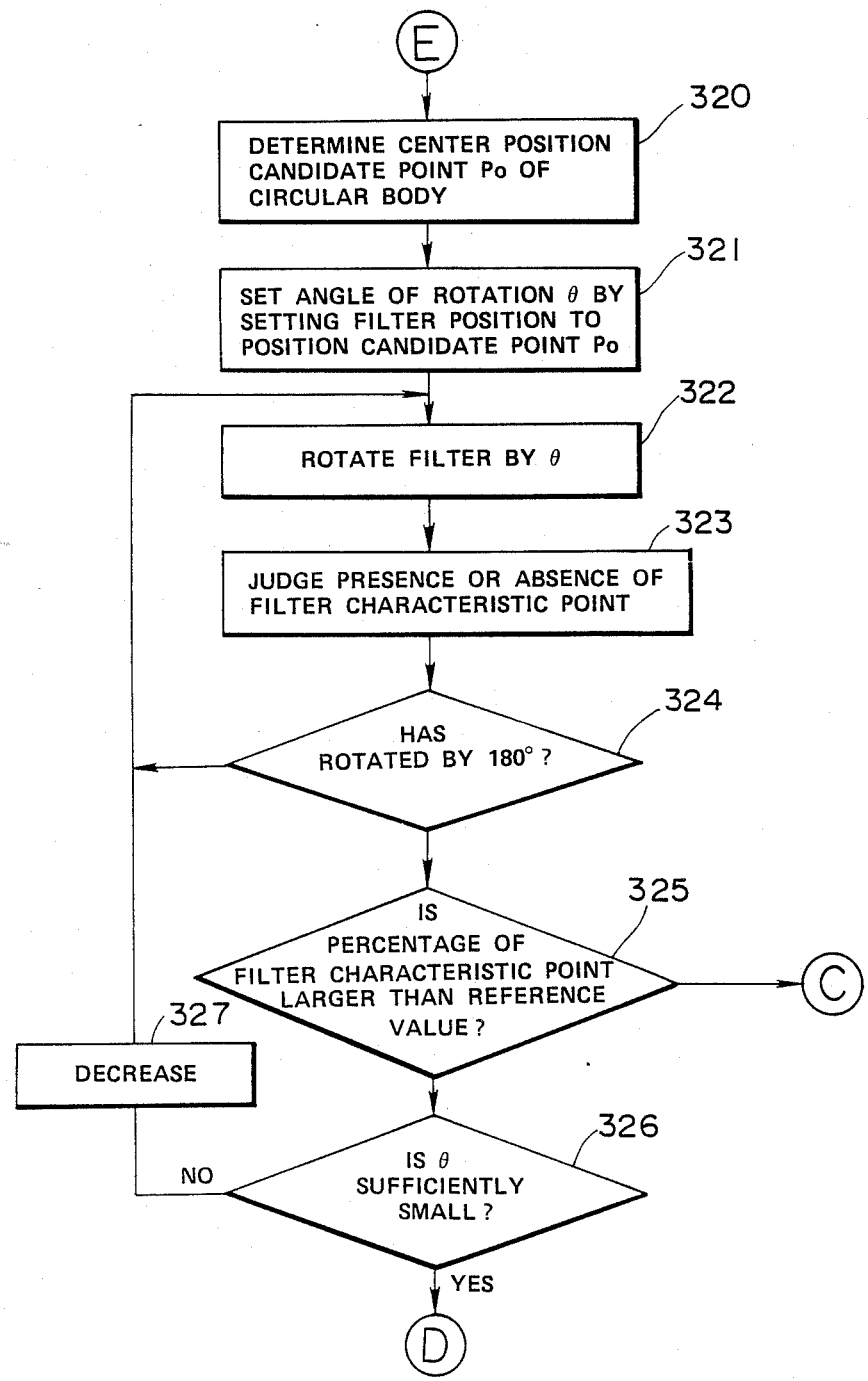

A method of identifying an object having a substantially circular contour line will now be described with reference to the flow charts as shown in FIGS. 23 and 24.

Figure 25:
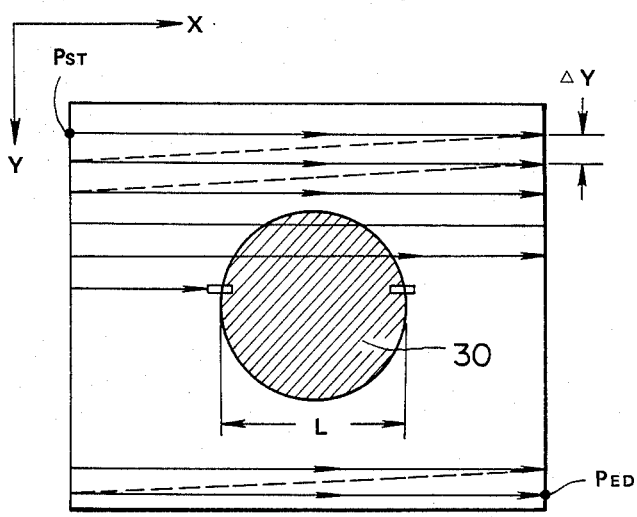

Suppose now that the object to be detected is a circular body 30 as shown in FIG. 25, that the filter identical to that shown in FIG. 5 is used, and that the center-to-center distance of two specified ranges $A_1$ and $A_2$ corresponds to the diameter L of the circular body 30.

In FIG. 23, for the purpose of searching the candidate point of the center position of the circular body 30, at steps 300–306, the contour line of the diameter portion of the circular body 30 is searched. Since the processings executed at these steps are similar to those of steps 100–106 shown in FIG. 8, these processings will not be described.

A case wherein the contour line of the diameter portion of the circular body 30, that is, the characteristic point has been detected will now be described.

In this case, the program is advanced to the flow chart shown in FIG. 24. The filter position (scanning position) Pi at the time of detecting the filter characteristic point is moved to the central point Ps between two contour candidate points Pa and Pb and this point Ps is stored as the tracing starting position Ps of the auxiliary scanning direction. More particularly, by noting that contour lines symmetrical to the center of the circular body are substantially parallel with each other in a given section, at step 311, the tracing starting position Ps is stored for the purpose of checking whether the filter characteristic points continue or not in a given length in the direction of the auxiliary scanning.

Then the scanning position is moved to a position just above the starting position Ps, and then at step 312, a judgment is made as to whether this point is the filter characteristic point or not. When the scanning position is the filter characteristic point, at step 313, the scanning position is moved to the central position between two contour candidata points while at the same time, the scanning position is stored. Then, a judgment is made as to whether the distance between the stored position and the starting position Ps is less than a reference distance or not. When the distance is less than the reference distance, the processing of the flow chart in which the tracing is effected again in the upward direction, whereas when the distance is larger than the reference distance, at step 314 shown in FIG. 24, the scanning for searching the filter characteristic point is executed. In this manner, the tracing of the filter characteristic point is continued until there is no more filter characteristic point. The reference distance described above is set to be equal to ⅔ of the radius of the circular body to be detected. When the distance exceeds the reference value, it is judged that it is too long for the parallel portions of a circle.

Where a point just above the scanning position is not the filter characteristic point, that is, when the upward tracing of the filter characteristic point terminates, at step 315, the scanning position is returned to the tracing starting position Ps and then at steps 316, 317 and 318, the filter characteristic point is traced downwardly in the same manner as above described.

When the downward tracing of the filter characteristic point terminates under a state wherein the distance from the starting position Ps to the scanning position is less than the reference value, all traced lengths in the upward and downward directions is obtained from the difference between the uppermost point $P_T$ and the lowermost point $P_B$ (FIG. 8) which were stored during the tracing, and at step 319, a judgment is made as to whether the traced length is larger or smaller than a predetermined reference length. When the traced length is shorter than the reference length, it is judged that the traced length is not the desired contour line. Then according to the flow chart shown in FIG. 23, the scanning for searching the filter scanning point is executed. On the other hand, when the traced length is longer than the reference length, it is judged that there is a possibility that a contour line of a circular body exists. Then a check is made as to whether there is a circular contour line or not.

Figure 26:
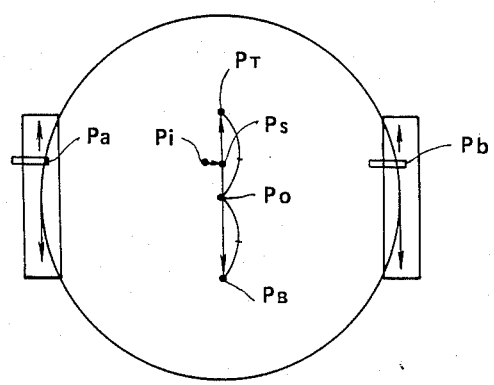
FIGS. 26 and 27 are diagrams useful to explain the flow chart shown in FIG. 24.
Figure 27:
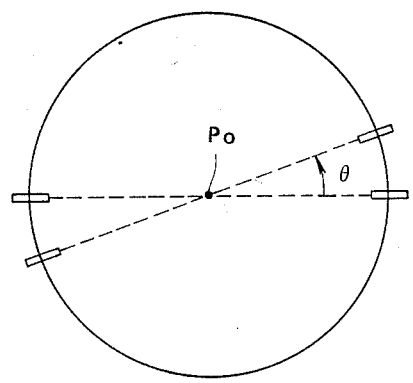

In this case, the candidate point $P_0$ (see FIG. 26) of the circular body is determined based on the center point between the uppermost point $P_T$ and the lowermost point $P_B$ of the tracing executed at step 320. Then, at step 321, the filter position is moved to the center position candidate position $P_0$ and a rotation angle $\theta$ is set by which the filter is rotated sequentially. Then as shown in FIG. 27, the filter is rotated by $\theta$ at step 322, and at step 323, a judgment is made as to whether the rotated position is the filter characteristic point or not. In this manner, at steps 323 and 324, presence or absence of the filter characteristic point is sequentially checked until the filter is rotated 180°. After the filter has been rotated 180°, at step 325, the percentage of the presence of the filter characteristic point is determined, and when the percentage is less than a reference value, the scanning for searching the filter characteristic point is executed according to the flow chart shown in FIG. 23. When the percentage is larger than the reference value, at step 326, a judgment is made as to whether the rotation angle $\theta$ is sufficiently small or not.

The angle $\theta$ is determined by the fineness of the check which depends upon the fact that to what extent the picture image contains the characteristic of a circle. Consequently, when the circle contains less characteristic points of the circle, the angle $\theta$ is made to be small. The reference percentage depends upon the nature of the contour line in the picture image so that when the continuity of the contour line is high, a percentage closer to unity is selected.

When the angle $\theta$ is sufficiently small, at step 330 shown in FIG. 23, it is judged that an object has been detected, thus terminating the picture image processing. On the other hand, when the angle is not sufficiently small, at step 327, the angle $\theta$ is made small. By using the reduced angle $\theta$, the filter characteristic point is checked again.

Although in the foregoing embodiment, the presence or absence of an object to be detected is judged based upon the percentage of the filter characteristic points, the presence or absence of the object can also be judged by the percentage of the total number of the contour candidate points. It will be clear that the object to be detected is not limited to a circle and that any objects having a contour resembling a circle (ecllipse or polygon) can also be detected.

What is claimed is:

1. A method of identifying an object to be detected wherein said object is photgraphed and is identified by detecting a portion of a contour line of the detection object from a photographed input picture image data, said method comprising the steps of:

preparing a filter means for designating a plurality of filter element data sets, each of said filter element data sets consisting of a first data indicative of the amounts of offset in two given points from a reference point, said two points being set in a manner such that one of the two points is placed inside of the photographed input picture image data of said detection object and the other one of the two points is placed outside of the photographed input picture image data of said detection object along the boundary of said contour line so as to sandwich the portion of the contour line of said detection object, a second data indicative of a threshold value of a brightness difference between picture image data of said input picture image data corresponding these two points, and a third data indicative of a condition about a gradient in the brightness between picture image data corresponding to the two points, the number of said filter element data sets being determined according to a number by which a shape of the detection object can be determined, said filter element data sets being previously registered in a proper memory;

trace scanning said input picture image on the basis of said filter means; and identifying that the object is present when the brightness difference between the picture image data corresponding to the two points and represented by said first data exceed respective threshold values represented by said second data simultaneously with respect to all said filter element data sets and also when the brightness gradient between the picture image data corresponding to the two points satisfies the corresponding condition represented by said third data with respect to all said filter element data sets.

2. A method as set forth in claim 1, wherein said first data are set so that a line connecting the two points indicative of the first data is perpendicular to the corresponding contour line.

3. A method as set forth in claim 2, wherein the contour line of said object to be detected has a portion comprising parallel lines in an auxiliary picture-image scanning direction, said filter means has two sorts of data corresponding to the contour line comprising said parallel lines as the filter element data, said method comprisng the steps of:

trace scanning said filter means in the auxiliary scanning direction from said scanning position when the brightness difference between the picture image data corresponding to the two points represented by said first data exceeds respective threshold values represented by said second data simultaneously with respect to said two sorts of data and also when the brightness gradient between the picture image data corresponding to the two points satisfies the corresponding condition represented by said third data with respect to said two sorts of data; and identifying the presence of the detection object when a traced length exceeds a predetermined level.

4. A method as set forth in claim 3, wherein said trace scanning of said filter means in said auxiliary scanning direction is realized by using a central point between two contour candidate points as a tracing starting position when said two sorts of data are simultaneously satisfied, said method comprising the steps of:

detecting the presence or absence of the simultaneous satisfaction of said two sorts of data when a central position of four points represented by the respective first data of the two sorts of data is moved to a point just above said tracing starting position in the auxiliary scanning direction;

detecting the presence or absence of the simultaneous satisfaction of the two sorts of data by moving said central point to another point just above the tracing starting position in the auxiliary scanning direction when the two sorts of data are simultaneously satisfied;

sequentially repeating each detecting step until no simultaneous satisfaction of the two sorts of data is achieved any more; and repeatingly scanning similarly also downwardly from the tracing starting position with said filter means.

5. A method as set forth in claim 4, wherein said detection object has a substantially circular contour line and said filter means has two sorts of data corresponding to a diameter of said substantially circular line as filter element data sets, said method comprising the steps of:

trace scanning said filter means in the auxiliary scanning direction from said tracing starting position when the brightness difference between the picture image data corresponding to the two points represented by said first data exceeds the corresponding threshold value represented by said second data simultaneously with said respect to said two sorts of data and also when the brightness gradient between the picture image data corresponding to the two points satisfies the corresponding condition represented by said third data with respect to said two sorts of data;

finding a circular center position candidate point of said contour line on the basis of the central position between four points represented by the respective first data of said two sorts of data and a center position of a traced length when said traced length exceeds a preset length;

detecting the presence or absence of simultaneous satisfaction of said two sorts of data by trace scanning said filter means in such a direction as to rotate the filter means about said circular center position candidate point sequentially at intervals of a predetermined angle; and identifying the presence of the detection object when percentage of the simultaneous satisfaction of the two sorts of data reaches a predetermined value after completion of said trace scanning rotating direction.

* * * * *